United States Patent
Tamai et al.

(10) Patent No.: US 8,362,730 B2
(45) Date of Patent: Jan. 29, 2013

(54) SYNCHRONOUS MACHINE STARTING DEVICE

(75) Inventors: Shinzo Tamai, Tokyo (JP); Yosuke Fujii, Tokyo (JP); Akinobu Ando, Tokyo (JP); Yasuhiko Hosokawa, Tokyo (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 0 days.

(21) Appl. No.: 13/132,792

(22) PCT Filed: Dec. 5, 2008

(86) PCT No.: PCT/JP2008/072143
§ 371 (c)(1),
(2), (4) Date: Aug. 12, 2011

(87) PCT Pub. No.: WO2010/064318
PCT Pub. Date: Jun. 10, 2010

(65) Prior Publication Data
US 2011/0298406 A1 Dec. 8, 2011

(51) Int. Cl.
H02P 6/20 (2006.01)
(52) U.S. Cl. ............. 318/400.33; 318/503; 318/560
(58) Field of Classification Search ......... 318/400.33, 318/503, 560
See application file for complete search history.

(56) References Cited

U.S. PATENT DOCUMENTS 6,388,416 B1  5/2002  Nakatani et al.
7,064,513 B2 *  6/2006  Fenley ............ 318/700
(Continued)

FOREIGN PATENT DOCUMENTS

JP    58 186397    10/1983
JP    1 206894    8/1989
(Continued)

OTHER PUBLICATIONS

A.C. Williamson, "Starting of convertor-fed asynchronous machine drives," IEE Proceedings, vol. 132, pp. 209-214, Jul. 1985.*

(Continued)

*Primary Examiner* — Walter Benson
*Assistant Examiner* — Said Bouziane
(74) *Attorney, Agent, or Firm* — Oblon, Spivak, McClelland, Maier & Neustadt, L.L.P.

(57) ABSTRACT

In a synchronous machine starting device, an AC voltage detection unit detects AC voltage supplied to an armature of a synchronous machine through an electric power line from a power conversion unit. The AC voltage detection unit has a first output end and a second output end isolated from the electric power line, transforms AC voltage supplied through the electric power line at a first ratio to output the transformed voltage from the first output end, and transforms AC voltage supplied through the electric power line at a second ratio and then limits the transformed voltage to a prescribed positive voltage value or lower and a prescribed negative voltage value or higher for output from the second output end. Then, a detected voltage selection unit selects one of the voltage received from the first output end and the voltage received from the second output end, and outputs the selected one to a rotor position detection unit. The rotor position detection unit detects a rotor position of the synchronous machine based on the voltage received from the detected voltage selection unit. A power conversion control unit controls the power conversion unit based on the detected rotor position.

4 Claims, 3 Drawing Sheets

U.S. PATENT DOCUMENTS

2007/0194730 A1* 8/2007 Fukamizu et al. ............ 318/254
2011/0181220 A1 7/2011 Tamai et al.

FOREIGN PATENT DOCUMENTS

| JP | 2001 54295 | 2/2001 |
| JP | 2002 281795 | 9/2002 |
| JP | 2006 271038 | 10/2006 |

OTHER PUBLICATIONS

U.S. Appl. No. 13/391,947, filed Feb. 23, 2012, Tamai, et al.
International Search Report issued Mar. 10, 2009 in PCT/JP08/072143 filed Dec. 5, 2008.
U.S. Appl. No. 13/129,993, filed May 18, 2011, Tamai, et al.

* cited by examiner

SYNCHRONOUS MACHINE STARTING DEVICE

TECHNICAL FIELD

The present invention relates to a synchronous machine starting device, and more particularly to a synchronous machine starting device which detects a rotor position of a synchronous machine.

BACKGROUND ART

Synchronous machine starting devices for starting synchronous machines such as generators and motors have been developed. Conventionally, a synchronous machine starting device uses a mechanical distributor which detects the position of a rotor of a synchronous machine, for example, by a proximity switch. However, the mechanical distributor is fragile and is susceptible to noise due to a large amount of wiring.

Japanese Patent Laying-Open No. 2006-271038 (Patent Document 1) discloses an example of a synchronous machine starting device for eliminating the need for such a mechanical distributor. Specifically, this synchronous generator starting device includes an externally communicated converter formed of externally communicated devices such as thyristors and an externally communicated inverter formed of externally communicated devices such as thyristors for converting DC (direct current) power obtained from the converter into AC (alternating current) power, to start a synchronous generator using AC power obtained from the inverter. Then, the synchronous generator starting device includes an AC voltage detector detecting voltage of an armature terminal of the synchronous generator, an AC current detector detecting inverter output current fed from the inverter into an armature of the synchronous generator, an induction voltage operation circuit calculating an in-phase component and a quadrature component with respect to a first reference phase, of induction voltage induced at an armature winding of the synchronous generator by field current of the synchronous generator, from an AC current detection value of the inverter from the output current detector and a first synchronous generator rotational speed estimated value, and a PLL circuit outputting a second reference phase and a second synchronous generator rotational speed estimated value such that the orthogonal component of the first reference phase of the induction voltage from the induction voltage operation circuit is zero. Then, the synchronous generator starting device generates a gate pulse of the inverter at a predetermined control advance angle based on the second reference phase output from the PLL circuit, and, in addition, inputs the second reference phase to the first reference phase of the induction voltage operation circuit and inputs the second synchronous generator rotational speed estimated value to the first synchronous generator rotational speed estimated value of the induction voltage operation circuit.

Patent Document 1: Japanese Patent Laying-Open No. 2006-271038

DISCLOSURE OF THE INVENTION

Problems to be Solved by the Invention

The voltage supplied to the armature of a synchronous machine at the time of starting is as extremely small as, for example, one-thousandth of a rated voltage at the time of steady operation. Therefore, with the configuration disclosed in Patent Document 1, it is difficult to detect the voltage supplied to the armature of the synchronous machine with high accuracy at the time of starting and to accurately detect the position of the rotor, so that the synchronous machine sometimes cannot be started stably.

Therefore, an object of the present invention is to provide a synchronous machine starting device capable of stably starting a synchronous machine.

Means for Solving the Problems

A synchronous machine starting device in accordance with an aspect of the present invention includes: a power conversion unit for converting supplied power into AC power and supplying the AC power to an armature of a synchronous machine; an electric power line for supplying the AC power from the power conversion unit to the synchronous machine; an AC voltage detection unit for detecting AC voltage supplied to the armature of the synchronous machine through the electric power line; a rotor position detection unit for detecting a rotor position of the synchronous machine, based on the detected AC voltage; and a power conversion control unit for controlling the power conversion unit, based on the detected rotor position. The AC voltage detection unit has a first output end and a second output end isolated from the electric power line, transforms AC voltage supplied through the electric power line at a first ratio to output the transformed voltage from the first output end, and transforms AC voltage supplied through the electric power line at a second ratio and limits the transformed voltage to a prescribed positive voltage value or lower and a prescribed negative voltage value or higher for output from the second output end. The synchronous machine starting device further includes a detected voltage selection unit for selecting one of the voltage received from the first output end and the voltage received from the second output end and outputting the selected one to the rotor position detection unit.

Preferably, the AC voltage detection unit has a first output end and a second output end isolated from the electric power line, lowers AC voltage supplied through the electric power line at a first ratio to output the lowered voltage from the first output end, and lowers AC voltage supplied through the electric power line at a second ratio and then limits the lowered voltage to a prescribed positive voltage value or lower and a prescribed negative voltage value or higher for output from the second output end.

Preferably, the AC voltage detection unit includes a voltage transformer including a primary coil coupled to the electric power line and a secondary coil coupled as the first output end to the detected voltage selection unit, and a voltage conversion circuit having an input end coupled to the electric power line and the second output end isolated from the input end and coupled to the detected voltage selection unit, for transforming voltage at the input end and then limiting the transformed voltage to a prescribed positive voltage value or lower and a prescribed negative voltage value or higher for output from the second output end.

Preferably, the AC voltage detection unit includes a first voltage transformer including a primary coil coupled to the electric power line and a secondary coil, a second voltage transformer including a primary coil coupled to the secondary coil of the first voltage transformer and a secondary coil coupled as the first output end to the detected voltage selection unit, and a clamping circuit coupled to the secondary coil of the first voltage transformer and having the second output end coupled to the detected voltage selection unit, for limiting voltage of the secondary coil to a prescribed positive voltage value or lower and a prescribed negative voltage value or higher for output from the second output end.

Effects of the Invention

According to the present invention, a synchronous machine can be started stably.

DESCRIPTION OF THE REFERENCE SIGNS 1 converter, 2 inverter, 3 DC reactor, 8, 58 AC voltage detector, 9 AC current detector, 11 rotor position detection unit, 12 reference sinusoidal wave operator, 13 gate pulse generator, 14 β command circuit, 19 inverter control unit (power conversion control unit), 51 detected voltage selection unit, 61, 62 DCVT, 71 power conversion unit, 101, 102 synchronous machine starting device, CB control board, LN electric power line, VT1, VT2 voltage transformer, L1, L3, L5, L7 primary coil, L2, L4, L6, L8 secondary coil, CP1, CP2 clamping circuit, R1, R2, R3, R4, R5, R6 resistor, ZD1, ZD2, ZD3, ZD4 Zener diode.

BEST MODES FOR CARRYING OUT THE INVENTION

In the following, embodiments of the present invention will be described with reference to the figures. It is noted that the same or corresponding parts in the figures are denoted with the same reference signs, and a description thereof will not be repeated.

<First Embodiment>

Figure 1:
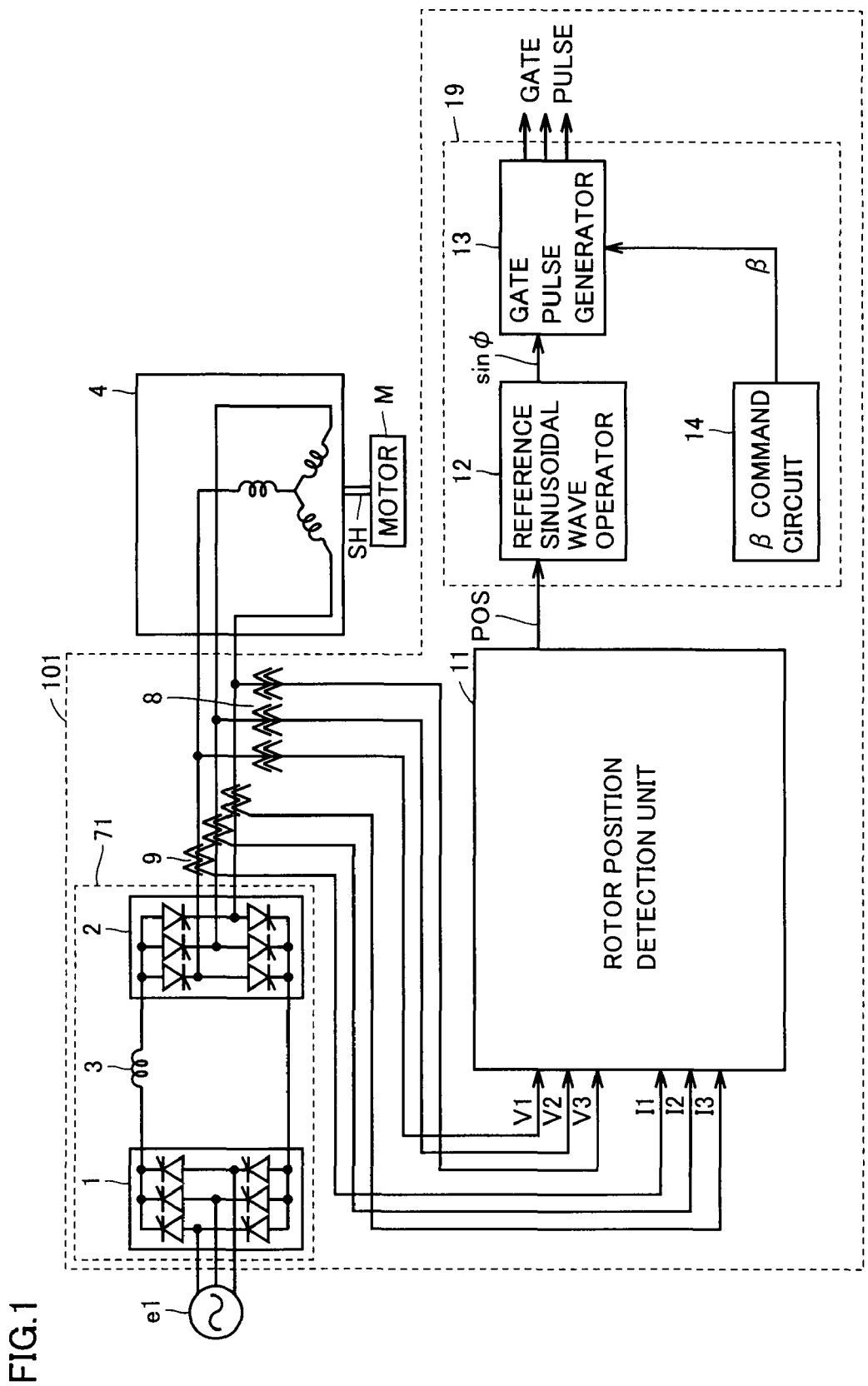
FIG. 1 is a diagram showing a configuration of a synchronous machine starting device in accordance with a first embodiment of the present invention.

FIG. 1 is a diagram showing a configuration of a synchronous machine starting device in accordance with a first embodiment of the present invention.

Referring to FIG. 1, a synchronous machine starting device 101 includes a power conversion unit 71, an AC voltage detector 8, an AC current detector 9, a rotor position detection unit 11, and an inverter control unit (power conversion control unit) 19. Power conversion unit 71 includes a converter 1, an inverter 2, and a DC reactor 3. Inverter control unit 19 includes a reference sinusoidal wave operator 12, a gate pulse generator 13, and a β command circuit 14.

A synchronous machine 4 and a motor M are connected with each other via a shaft SH. Synchronous machine 4 is, for example, a synchronous generator or a synchronous motor and has an armature and a rotor. Motor M rotates at a prescribed speed when synchronous machine 4 is on standby. The rotational speed is low, for example, a few rpm. By contrast, the rotational speed in the normal operation is 3000 rpm to 3600 rpm. Therefore, the voltage applied to the armature of synchronous machine 4 at the time of starting is as extremely small as one-thousandth of the steady operation, as described above, and is difficult to detect accurately, partly because the detection voltage by AC voltage detector 8 is often distorted.

Converter 1 is formed of an element such as a thyristor and converts AC power from an AC power supply e1 into DC power.

Inverter 2 is formed of an element such as a thyristor and converts the DC power obtained from converter 1 into AC power for supply to the armature of synchronous machine 4, thereby driving synchronous machine 4.

Converter 1 and inverter 2 are connected with each other via DC reactor 3. The AC side of inverter 2 is connected to the armature of generator 4.

AC voltage detector 8 detects three-phase AC voltage supplied to the armature of generator 4 and outputs voltage detection values V1, V2, V3 to rotor position detection unit 11.

AC current detector 9 detects the three-phase AC current supplied to the armature of generator 4 and outputs current detection values I1, I2, I3 to rotor position detection unit 11.

Rotor position detection unit 11 detects the rotor position (phase) of generator 4, based on the detection values received from AC voltage detector 8 and AC current detector 9, and outputs a rotor position signal POS to inverter control unit 19 to indicate the rotor position of generator 4.

Inverter control unit 19 controls inverter 2 based on rotor position signal POS received from rotor position detection unit 11.

In inverter control unit 19, reference sinusoidal wave operator 12 outputs a reference sinusoidal wave sin φ based on position signal POS received from rotor position detection unit 11.

β command circuit 14 calculates and outputs a control-advance-angle command value β to gate pulse generator 13.

Gate pulse generator 13 outputs a gate pulse to the element in inverter 2, based on reference sinusoidal wave sin φ received form reference sinusoidal wave operator 12 and control-advance-angle command value β received from β command circuit 14.

Figure 2:
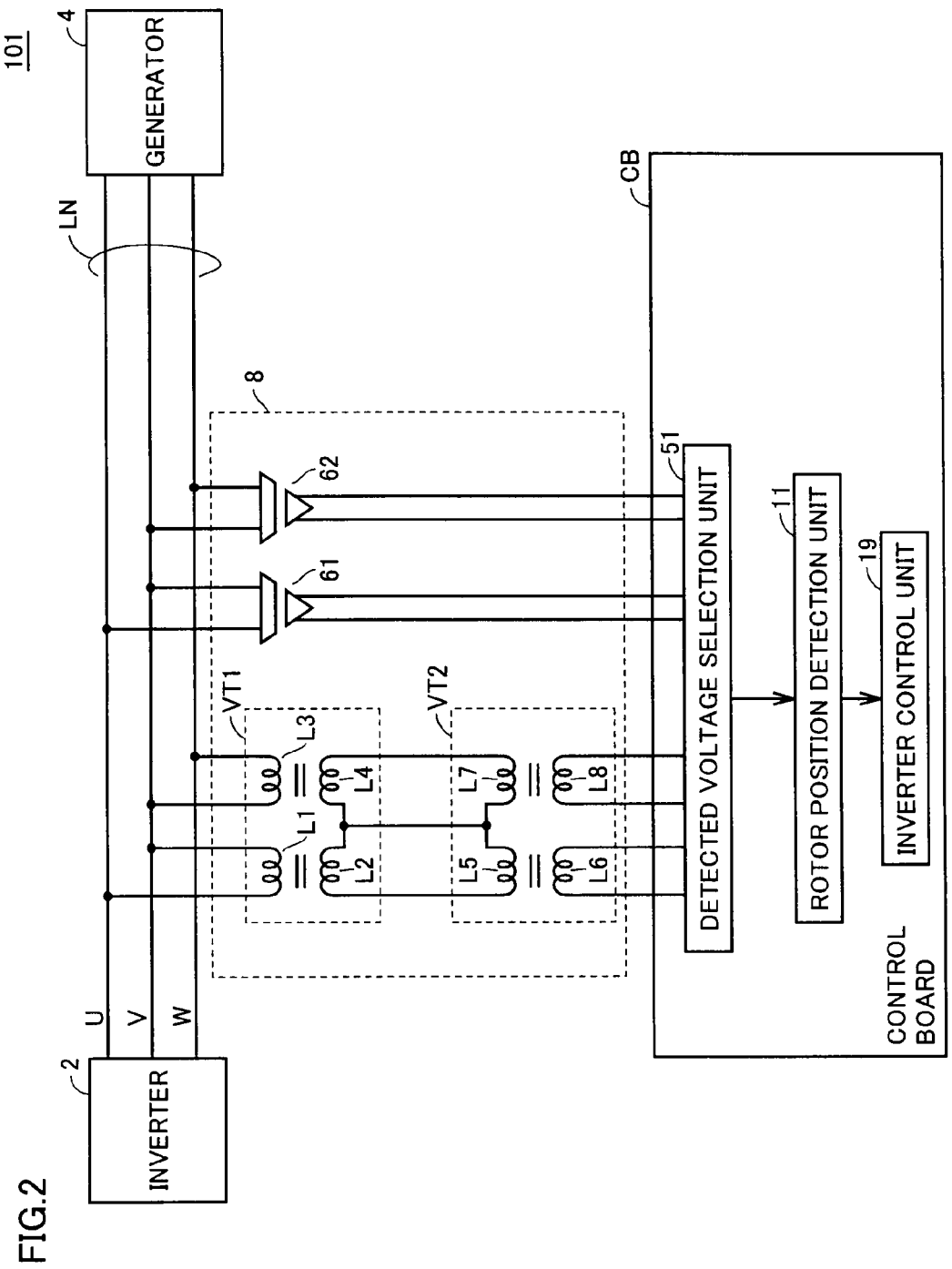
FIG. 2 is a diagram showing a configuration of an AC voltage detector 8 and its peripheral circuit in detail.

FIG. 2 is a diagram showing a configuration of DC voltage detector 8 and its peripheral circuit in detail.

Referring to FIG. 2, synchronous machine starting device 101 further includes a detected voltage selection unit 51, a control board CB, and an electric power line LN. Detected voltage selection unit 51 and rotor position detection unit 11 are mounted on control board CB. AC voltage detector 8 includes voltage transformers VT, VT2 and DCVT (Direct Current Voltage Transformer) 61, 62. Voltage transformer VT1 includes primary coils L1, L3 and secondary coils L2, L4. Voltage transformer VT2 includes primary coils L5, L7 and secondary coils L6, L8.

In voltage transformer VT1, of three phases of AC voltage supplied to the armature of generator 4, AC voltage between U-phase and V-phase and AC voltage between V-phase and W-phase are transformed at a prescribed rate of transformer, and the transformed AC voltages are induced to secondary coils L2, L4.

In voltage transformer VT2, the AC voltages induced at voltage transformer VT1 are transformed at a prescribed ratio of transformer and induced to secondary coils L6, L8, and the induced voltages are then applied to detected voltage selection unit 51.

For example, in steady operation of generator 4, AC voltage of 3.6 kV is applied to the primary side of voltage transformer VT1, that is, electric power line LN. The AC voltage of 3.6 kV is lowered to AC voltage of 100V, which is output from the secondary side of voltage transformer VT1, and the AC voltage of 100V is lowered to AC voltage of a few V, which is output from the secondary side of voltage transformer VT2.

Therefore, if the voltage range handled in control board CB is, for example, ±10 V, rotor position detection unit 11 can correctly recognize the supply to the armature of generator 4.

DCVT 61 has an input end connected to electric power line LN and an output end isolated from the input end and connected to detected voltage selection unit 51. DCVT 61 isolates the voltage at the input end, transforms the voltage at the input end appropriately, and then limits the transformed voltage to a prescribed positive voltage value or lower and a prescribed negative voltage value or higher for output from the output end to detected voltage selection unit 51. More specifically, DCVT 61 includes a not-shown transformer isolation circuit transmitting the AC voltage between U-phase and V-phase, of three phases of AC voltage supplied to the armature of generator 4, from the primary side to the secondary side, and a not-shown clamping circuit limiting the AC voltage transmitted by the transformer isolation circuit to a prescribed positive voltage value or lower and to a prescribed negative voltage value or higher.

DCVT 62 has an input end connected to electric power line LN and an output end isolated from the input end and connected to detected voltage selection unit 51 DCVT 62 isolates the voltage at the input end, transforms the voltage at the input end appropriately, and then limits the transformed voltage to a prescribed positive voltage value or lower and a prescribed negative voltage value or higher for output from the output end to detected voltage selection unit 51. More specifically, DCVT 62 includes a not-shown transformer isolation circuit transmitting the DC voltage between V-phase and W-phase, of three phases of AC voltage supplied to the armature of generator 4, from the primary-side coil to the secondary-side coil, and a not-shown clamping circuit limiting the AC voltage transmitted by the transformer isolation circuit to a prescribed positive voltage value or lower and to a prescribed negative voltage value or higher.

For example, DCVT 61 and 62 each include a clamping circuit clamping an output voltage larger than 10 V, to 10V. At the time of starting generator 4, AC voltage of a few V to a few hundred V is applied to the input ends of DCVT 61 and 62, that is, electric power line LN, and AC voltage lowered to a few V or lower is output from the output ends of DCVT 61 and 62. During acceleration and then in steady operation of generator 4, AC voltage of a few kV is applied to the input ends of DCVT 61 and 62, that is, electric power line LN, the AC voltage of a few kV is lowered, and the voltage exceeding ±10V is further clamped for output from the output ends of DCVT 61 and 62.

Accordingly, the voltage at the time of starting generator 4 is transmitted to rotor position detection unit 11 at a level as high as possible within the voltage range handled in control board CB, so that the voltage detection accuracy at the time of starting generator 4 is improved and the detection accuracy of rotor position detection unit 11 can be improved. Furthermore, during acceleration and steady operation when the starting of generator 4 is completed, the voltage supplied to the armature of generator 4 increases to exceed the voltage range handled in control board CB. However, the clamping circuit of DCVT prevents overvoltage from being applied and causing a circuit failure in control board CB.

Detected voltage selection unit 51 selects one of the voltage received from voltage transformer VT2 and the voltage received from DCVT 61 and 62, and outputs the selected one to rotor position detection unit 11. More specifically, at the time of starting generator 4, for example, when the rotational speed of the rotor of generator 4 is lower than a prescribed value or when the magnitude of the terminal voltage of generator 4 is smaller than a prescribed value, detected voltage selection unit 51 selects and outputs the voltage received from DCVT 61 and 62 to rotor position detection unit 11. On the other hand, for example, when the magnitude of the terminal voltage of generator 4 becomes a prescribed value or greater because of acceleration of generator 4, or when the rotational speed of the rotor of generator 4 is a prescribed value or higher, detected voltage selection unit 51 selects and outputs the voltage received from voltage transformer VT2 to rotor position detection unit 11.

With such a configuration, at the time of starting when the level of AC voltage supplied to the armature of generator 4 is extremely small, the small-level AC voltage can be transmitted to rotor position detection unit 11 by DCVT 61 and 62 without being excessively lowered and causing deterioration of detection accuracy.

In steady operation during which the level of AC voltage supplied to the armature of generator 4 is large, the large-level AC voltage can be lowered appropriately by voltage transformers VT1 and VT2 to be transmitted to rotor position detection unit 11. Furthermore, since the large-level AC voltage is clamped and transmitted to rotor position detection unit 11 by DCVT 61 and 62, excessively high voltage can be prevented from being applied to the circuits mounted on control board CB.

Therefore, the synchronous machine starting device in accordance with the first embodiment of the present invention can detect the voltage supplied to the armature of generator 4 at the time of starting with high precision and can detect the position of the rotor of generator 4 correctly, thereby stably starting generator 4.

In the synchronous machine starting device in accordance with the first embodiment of the present invention, AC voltage detection unit 8 is configured to include voltage transformers VT1 and VT2 as well as DCVT 61 and 62. However, the present invention is not limited thereto. Any circuit may be employed as long as AC voltage detection unit 8 has a first output end and a second output end isolated from electric power line LN, transforms AC voltage supplied through electric power line LN at a prescribed ratio of transformer to output the transformed voltage from the first output end to detected voltage selection unit 51, and transforms AC voltage supplied through electric power line LN at a prescribed ratio of transformer and then limits the transformed voltage to a prescribed positive voltage value or lower and a prescribed negative voltage value or higher for output from the second output end to detected voltage selection unit 51.

AC voltage detection unit 8 shown in FIG. 2 is configured to detect AC voltage between U-phase and V-phase and AC voltage between V-phase and W-phase, of three phases of AC voltage supplied to the armature of generator 4. If the AC voltages of these two phases are detected, the AC voltage between W-phase and U-phase can be obtained by calculation.

In the synchronous machine starting device in accordance with the first embodiment of the present invention, power conversion unit 71 is configured to include converter 1, inverter 2, and DC reactor 3. However, the present invention is not limited thereto. Power conversion unit 71 may be, for example, a matrix converter, in place of converter 1, inverter 2, and DC reactor 3, as long as it is configured to include any circuit that converts supplied power into AC power and supply the AC power to the armature of synchronous machine 4.

Another embodiment of the present invention will now be described using the drawings. It is noted that in the figures the same or corresponding parts are denoted with the same reference signs, and a description thereof will not be repeated.

<Second Embodiment>

The present embodiment relates to a synchronous machine starting device which differs from the synchronous machine starting device in accordance with the first embodiment in that a high voltage circuit is eliminated. Except the description given below, it is similar to the synchronous machine starting device in accordance with the first embodiment.

Figure 3:
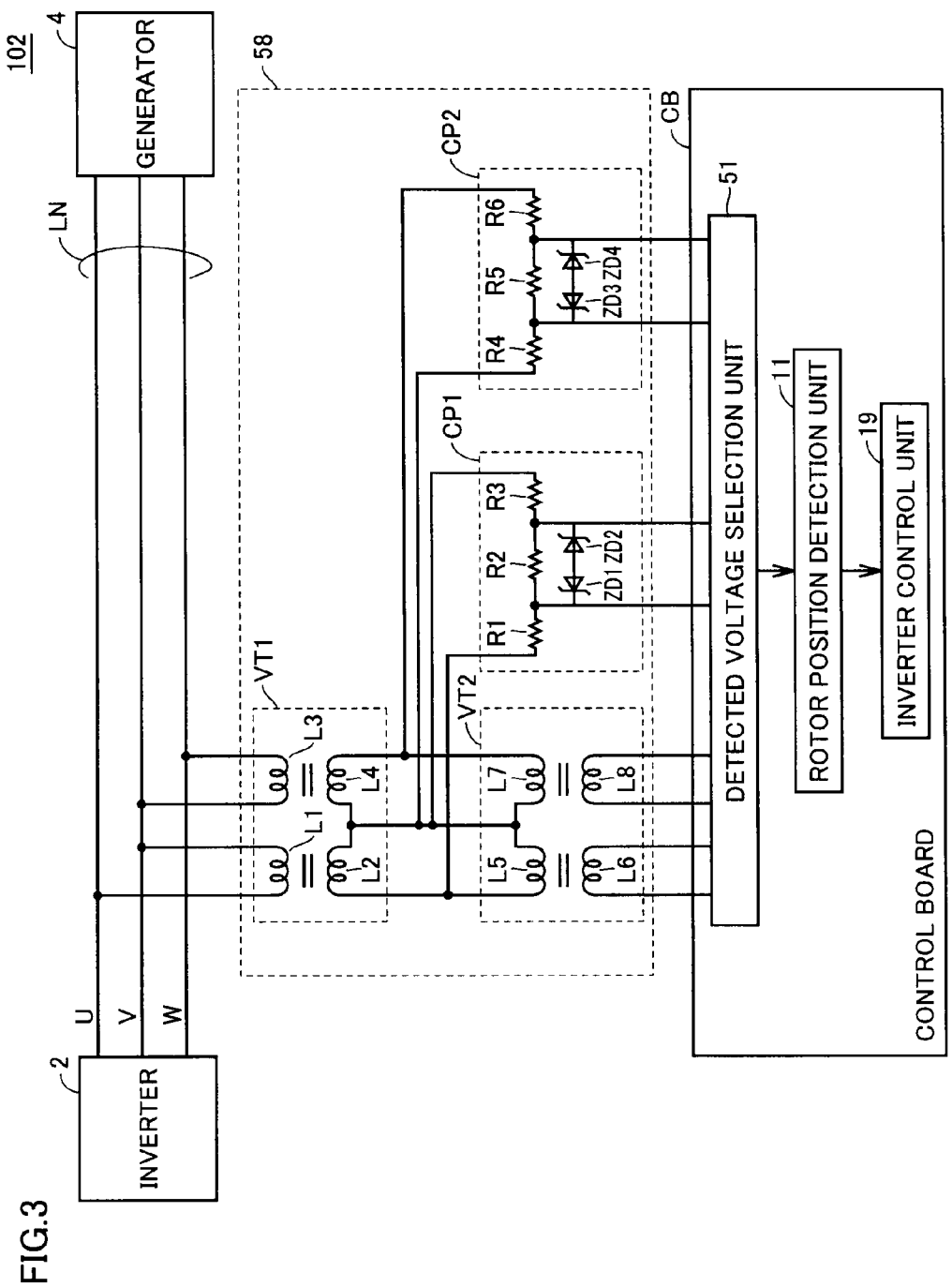
FIG. 3 is a diagram showing a configuration of a synchronous machine starting device in accordance with a second embodiment of the present invention.

FIG. 3 is a diagram showing a configuration of a synchronous machine starting device in accordance with the second embodiment of the present invention.

Referring to FIG. 3, a synchronous machine starting device 102 differs from the synchronous machine starting device in accordance with the first embodiment of the invention in that AC voltage detector 8 is replaced by an AC voltage detector 58.

AC voltage detector 58 includes voltage transformers VT1, VT2 and clamping circuits CP1, CP2. Clamping circuit CP1 includes resistors R1, R2, R3 and Zener diodes ZD1, ZD2. Clamping circuit CP2 includes resistors R4, R5, R6 and Zener diodes ZD3, ZD4.

In clamping circuit CP1, resistor R1 has a first end connected to the first end of secondary coil L2 and the first end of primary coil L5, and a second end connected to the first end of resistor R2, the cathode of Zener diode ZD1, and detected voltage selection unit 51. Resistor R3 has a first end connected to the second end of secondary coil L2 and the second end of primary coil L5, and a second end connected to a second end of resistor R2, the cathode of Zener diode ZD2, and detected voltage selection unit 51. The anode of Zener diode ZD1 and the anode of Zener diode ZD2 are connected with each other.

In clamping circuit CP2, resistor R4 has a first end connected to the first end of secondary coil L4 and the first end of primary coil L7, and a second end connected to the first end of resistor R5, the cathode of Zener diode ZD3, and detected voltage selection unit 51. Resistor R6 has a first end connected to the second end of secondary coil L4 and the second end of primary coil L7, and a second end connected to the second end of resistor R5, the cathode of Zener diode ZD4, and detected voltage selection unit 51. The anode of Zener diode ZD3 and the anode of Zener diode ZD4 are connected with each other.

Clamping circuit CP1 limits AC voltage induced to secondary coil L2 to a prescribed positive voltage value or lower and a prescribed negative voltage value or higher for output to detected voltage selection unit 51.

More specifically, when the amplitude of AC voltage induced to secondary coil L2 is large, Zener diode ZD1 or ZD2 performs a constant-voltage clamping operation, so that the AC voltage induced to secondary coil L2 is clamped to AC voltage of a prescribed positive voltage value or lower and a prescribed negative voltage value or higher, for example, +10 V or lower and −10V or higher. Furthermore, the AC voltage induced to secondary coil L2 is divided by resistors R1, R2, R3, so that excessive current is prevented from flowing through Zener diodes ZD1, ZD2 when the amplitude of the AC voltage is large. Moreover, even when the amplitude of the AC voltage induced to secondary coil L2 is small, resistors R1, R2, R3 allow the AC voltage induced to secondary coil L2 to be transmitted to detected voltage selection unit 51.

Clamping circuit CP2 limits the AC voltage induced to secondary coil L4 to a prescribed positive voltage value or lower and a prescribed negative voltage value or higher for output to detected voltage selection unit 51.

More specifically, when the amplitude of AC voltage induced to secondary coil L4 is large, Zener diode ZD3 or ZD4 performs a constant-voltage clamping operation, so that the AC voltage induced to secondary coil L4 is clamped to AC voltage of a prescribed positive voltage value or lower and a prescribed negative voltage value or higher, for example, +10 V or lower and −10V or higher. Furthermore, the AC voltage induced to secondary coil L4 is divided by resistors R4, R5, R6, so that excessive current is prevented from flowing through Zener diodes ZD3, ZD4 when the amplitude of the AC voltage is large. Moreover, even when the amplitude of the AC voltage induced to secondary coil L4 is small, resistors R4, R5, R6 allow the AC voltage induced to secondary coil L4 to be transmitted to detected voltage selection unit 51.

For example, in steady operation of generator 4, AC voltage of 3.6 kV is applied to the primary side of voltage transformer VT1, that is, electric power line LN, and the AC voltage of 3.6 kV is lowered to AC voltage of 100 V, which is output from the secondary side of voltage transformer VT1. Here, the AC voltage of 100 V is applied to the input ends of clamping circuits CP1, CP2, the AC voltage of 100V is divided by the resistors, and the AC voltage exceeding ±10V is further clamped and output from the output ends of clamping circuits CP1, CP2. On the other hand, at the time of starting generator 4, AC voltage of a few V or lower is applied to the input ends of clamping circuit CP1, CP2, and AC voltage divided by the resistors is output as it is from the output ends of clamping circuits CP1, CP2.

Detected voltage selection unit 51 selects one of the voltage received from voltage transformer VT2 and the voltage received from clamping circuits CP1 and CP2, and outputs the selected one to rotor position detection unit 11. More specifically, at the time of starting generator 4, for example, when the rotational speed of the rotor of generator 4 is lower than a prescribed value, or when the magnitude of the terminal voltage of generator 4 is smaller than a prescribed value, detected voltage selection unit 51 selects and outputs the voltage received from clamping circuits CP1 and CP2 to rotor position detection unit 11. On the other hand, in steady operation of generator 4, for example, when the rotational speed of the rotor of generator 4 is a prescribed value or higher, detected voltage selection unit 51 selects and outputs the voltage received from voltage transformer VT2 to rotor position detection unit 11.

The other configuration and operation is similar to that of the synchronous machine starting device in accordance with the first embodiment, and therefore, a detailed description thereof will not be repeated here.

With such a configuration, at the time of starting when the level of AC voltage supplied to the armature of generator 4 is extremely small, the small-level AC voltage can be transmitted to rotor position detection unit 11 by clamping circuits CP1 and CP2 without being lowered by voltage transformer VT2.

In steady operation during which the level of AC voltage supplied to the armature of generator 4 is large, the large-level AC voltage can be lowered appropriately by voltage transformers VT1 and VT2 within the voltage range handled in control board CB and then transmitted to rotor position detection unit 11. Furthermore, the large-level voltage induced to secondary coils L2 and L4 is clamped by clamping circuits CP1 and CP2 and then transmitted to rotor position detection unit 11, so that excessively high voltage can be prevented from being applied to the circuits mounted on control board CB.

Therefore, the synchronous machine starting device in accordance with the second embodiment of the present invention can detect the voltage supplied to the armature of generator 4 at the time of starting with high precision and can detect the position of the rotor of generator 4 correctly, thereby stably starting generator 4.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. A synchronous machine starting device comprising:
    a power conversion unit for converting supplied power into AC power and supplying the AC power to an armature of a synchronous machine;
    an electric power line for supplying said AC power from said power conversion unit to said synchronous machine;
    an AC voltage detection unit for detecting AC voltage supplied to the armature of said synchronous machine through said electric power line;
    a rotor position detection unit for detecting a rotor position of said synchronous machine, based on the detected AC voltage;
    a power conversion control unit for controlling said power conversion unit, based on the detected rotor position,
    wherein said AC voltage detection unit has a first output end and a second output end isolated from said electric power line, transforms AC voltage supplied through said electric power line at a first ratio to output the transformed voltage from said first output end, and transforms AC voltage supplied through said electric power line at a second ratio and then limits the transformed voltage to a prescribed positive voltage value or lower and a prescribed negative voltage value or higher for output from said second output end; and
    a detected voltage selection unit for selecting one of the voltage received from said first output end and the voltage received from said second output end and outputting the selected one to said rotor position detection unit.

2. The synchronous machine starting device according to claim 1, wherein said AC voltage detection unit has a first output end and a second output end isolated from said electric power line, lowers AC voltage supplied through said electric power line at a first ratio to output the lowered voltage from said first output end, and lowers AC voltage supplied through said electric power line at a second ratio and then limits the lowered voltage to a prescribed positive voltage value or lower and a prescribed negative voltage value or higher for output from said second output end.

3. The synchronous machine starting device according to claim 1, wherein said AC voltage detection unit includes
    a voltage transformer including a primary coil coupled to said electric power line and a secondary coil coupled as said first output end to said detected voltage selection unit, and
    a voltage conversion circuit having an input end coupled to said electric power line and said second output end isolated from said input end and coupled to said detected voltage selection unit, for transforming voltage at said input end and then limiting the transformed voltage to a prescribed positive voltage value or lower and a prescribed negative voltage value or higher for output from said second output end.

4. The synchronous machine starting device according to claim 1, wherein said AC voltage detection unit includes
    a first voltage transformer including a primary coil coupled to said electric power line and a secondary coil,
    a second voltage transformer including a primary coil coupled to said secondary coil of said first voltage transformer and a secondary coil coupled as said first output end to said detected voltage selection unit, and
    a clamping circuit coupled to said secondary coil of said first voltage transformer and having said second output end coupled to said detected voltage selection unit, for limiting voltage of said secondary coil to a prescribed positive voltage value or lower and a prescribed negative voltage value or higher for output from said second output end.

* * * * *